United States Patent [19]

Gustafsson et al.

[11] Patent Number: 5,436,282
[45] Date of Patent: Jul. 25, 1995

[54] ELIMINATING ODOUR/TASTE-PRODUCING SUBSTANCES IN PLASTIC MATERIALS WITH ZEOLITES

[75] Inventors: Bill Gustafsson, Stenungsund; Sune Olsson, Ödsmal; Bo Friman, Stenungsund, all of Sweden

[73] Assignee: Neste Oy, Keilaniemi, Finland

[21] Appl. No.: 169,965

[22] Filed: Dec. 20, 1993

Related U.S. Application Data

[63] Continuation of Ser. No. 941,080, Oct. 9, 1992, abandoned.

[30] Foreign Application Priority Data

Jan. 22, 1991 [SE] Sweden .................. 9100181

[51] Int. Cl.⁶ .................................... C08K 3/34
[52] U.S. Cl. ........................ 523/102; 138/174; 206/524.1; 206/524.3; 206/524.6; 524/450
[58] Field of Search ............ 524/450; 523/102; 206/524.3, 524.6, 524.1; 138/174

[56] References Cited

U.S. PATENT DOCUMENTS

| | | | |
|---|---|---|---|
| 4,250,081 | 2/1981 | Bode et al. | 524/450 |
| 4,487,810 | 12/1984 | Ascarelli et al. | 524/450 |
| 4,591,653 | 5/1986 | Suzuki et al. | 524/450 |
| 4,795,482 | 1/1989 | Gioffre et al. | 55/75 |
| 4,826,497 | 5/1989 | Marcus et al. | 55/75 |
| 4,855,154 | 8/1989 | Gioffre et al. | 426/417 |
| 4,910,295 | 3/1990 | Bernier et al. | 528/482 |
| 5,013,335 | 5/1991 | Marcus | 55/70 |

FOREIGN PATENT DOCUMENTS

| | | |
|---|---|---|
| 348978 | 3/1990 | European Pat. Off. . |
| 60-92379 | 5/1985 | Japan . |
| 2-209943 | 8/1990 | Japan . |
| 2-265961 | 10/1990 | Japan . |

*Primary Examiner*—Veronica P. Hoke
*Attorney, Agent, or Firm*—Merchant, Gould, Smith, Edell, Welter & Schmidt

[57] ABSTRACT

A process for eliminating in plastic materials odor/-taste-producing substances is described, the plastic material especially having the shape of water pipes, plastic containers or plastic film/sheeting for packing foodstuffs and pharmaceutical preparations, or interior fittings of plastic. In the process, there is added, during processing in the molten state, less than 0.5 wt.-%, preferably 0.05-0.3 wt.-%, of a substantially hydrophobic aluminum silicate molecular sieve having a pore diameter of at least 5.5 Å, an Si/Al molar ratio in the crystal lattice of at least 35, preferably 200-500, and a sorption capacity for water at 25° C. and 4.6 torr of less than 10 wt.-%, to the plastic material which subsequently is formed. The molecular sieve preferably has an average particle size not exceeding about 5 μm. The plastic material is a polyolefin plastic and is preferably selected among ethylene plastics and propylene plastics.

18 Claims, No Drawings

ELIMINATING ODOUR/TASTE-PRODUCING SUBSTANCES IN PLASTIC MATERIALS WITH ZEOLITES

This is a continuation of application Ser. No. 07/941,080, filed Oct. 9, 1992 now abandoned.

The present invention relates to a process for eliminating odour/taste-producing substances in plastic materials. The invention particularly relates to the elimination of undesired, unintentionally added, odour/taste-producing substances from polyolefin type materials, by which are henceforth meant homopolymers of ethylene or propylene or copolymers of one of these hydrocarbons with another alpha olefin, intended for fields of application where they may contact liquids or foodstuffs to be consumed by human beings or animals, or where any odour or taste may be experienced as negative for hygienic or aesthetic reasons.

In many contexts undesired, odour- and/or taste-producing substances appear owing to chemical degradation or transformation in connection with production or compounding of plastic materials. These substances can be of a highly varying chemical character. The occurrence thereof can constitute a health hazard or merely a source of irritation. Since the human being normally is most susceptible to odours and tastes, the substances need not appear in very high concentrations, but in most cases as low concentrations as one or a few ppm are sufficient to make a taste or odour evident. To date, attempts have been made to overcome or at least reduce such odour and taste problems in various ways, such as by degassing the plastic material. Such a method is not only lengthy and expensive; it also results in but a moderate improvement in respect of odour and taste, respectively.

Some specific fields will now be mentioned where the problem with undesired substances causing odour and/or taste is of particular significance.

Such a field comprises plastic pipes, more specifically plastic water pipes, where the emission of odour- and/or taste-producing substances from the plastic material to the drinking water flowing through the pipe frequently is an annoying problem which is difficult to solve. The problem grows more serious by the fact that no details of the odour/taste-producing substance(s) are known. It is believed that they consist of a variably composed mixture of different substances, such as oligomers, formed in the polymerisation, or volatile substances which have been formed by oxidisation processes in conjunction with subsequent steps of processing and which even at further small concentrations of about 1–1000 ppm in the water give this an undesired odour and/or taste.

A second field comprises film and sheeting of plastic material, more particularly film and sheeting that is caused to contact foodstuffs and pharmaceutical preparations. Since for foodstuffs and pharmaceutical preparations extremely high requirements as regards purity are made and no foreign substances contaminating the foodstuff or pharmaceutical preparation are allowed for reasons of health and security, it is vital that plastic film and sheeting used for such products does not emit any undesired or contaminating substances. In such plastic products, there is also a particularly great risk that undesired substances are produced, such as when boiling the foodstuff in the wrapping, or when sterilising the drug packing by heat treatment or radiation.

A closely related field is represented by containers, such as bottles, of blow-moulded or moulded plastic, for packing foodstuffs, beverages or pharamceutical preparations.

A further field applies to interior fittings of plastic, e.g. panels, for use in buildings or cars and the like. In new cars, it thus is not unusual that the odour can be very unpleasant.

In all four fields mentioned above, the possible odour which one may want to eliminate can appear especially in the compounding/processing of the plastic material and in this context constitutes a problem in the working environment.

From a general point of view, it is known to remove any undesired odour and/or taste by means of adsorbing substances, and as examples of such adsorbing substances, activated carbon, silica gel, activated aluminium oxide, diatomaceous earth and zeolites may be mentioned. An example in which a number of such additives are suggested, is Japanese Patent Specification JP 1,023,970 which thus is incorporated by reference. This publication suggests the adding of e.g. aluminium hydroxide, clay, diatomaceous earth, kaolin, talc, bentonire, activated carbon or activated carbon fibre for materials for packing foodstuffs to be heated in the packing. However, such additives have been found to be without any appreciable effect, except under special circumstances, in the case of undesired components in plastic materials of the types concerned according to the present invention since, as a rule, they lose their absorbing capacity when contacting water or water vapour.

Recently, U.S. Pat. No. 4,795,482 has described a new type of zeolites intended for the elimination of undesired odour in certain contexts and supplied under one of the names ABSCENT or SMELLRITE. These zeolites are described to be crystalline, siliceous molecular sieves in which at least about 90, and preferably at least about 95%, of the tetrahedral oxide units of the crystal lattice are $SiO_2$ tetrahedra, and which have a sorption capacity for water at 25° C. and 4.6 torr of less than 10 wt.-%. These zeolites have an Si/Al molar ratio of from 35 to infinity, preferably between 200 and 500, and a pore diameter of at least 5.5 Å, preferably at least 6.2 Å. It is also preferred that the sorption capacity for water vapour at 25° C. and a water vapour pressure of 4.6 torr is less than 6 wt.-%. These substantially hydrophobic molecular sieves are used to remove odorous organic compounds at a temperature of from −25° C. to 100° C.

It should here be added that the above-mentioned Si/Al molar ratio for these molecular sieves applies to the oxide units of the crystal lattice only. The Si/Al molar ratio of the zeolite, which has been determined by conventional wet analysis, can be considerably lower owing to contamination by aluminous pollutants formed in the so-called dealuminification reaction which in many cases is included as a step in the production of the zeolite.

The above-mentioned zeolitic molecular sieves have proved useful above all for removing undesired odour from hygienic products, such as diapers, incontinence products and the like. Reference is here also made to EP 0,348,978.

As a further example of prior-art technique while using the same type of zeolite, U.S. Pat. No. 4,910,295 may be mentioned. This patent relates to a specific process for reducing the odour of residual amounts of the comonomer ethylidene norbornene present in certain types of EPDM rubber.

One more example of prior art is U.S. Pat. No. 4,826,497 concerning fibrous absorbent articles, such as diapers and the like, intended for the absorption of body fluids. The diaper contains a zeolite which can be loosely arranged therein or, preferably, be immobilised.

According to the present invention, it has now surprisingly been found that by adding the above type of zeolitic molecular sieve it is possible to completely eliminate the above problem with undesired, odour- and/or taste-producing substances in plastic materials. By the term plastic material is here meant polyolefin plastic. The polyolefin plastic is preferably selected among ethylene plastic, i.e. plastic based on polyethylene or on copolymers of ethylene, in which the ethylene monomer constitutes the largest part of the mass, or propylene plastic, i.e. plastic based on polypropylene or on copolymers of propylene in which the propylene monomer constitutes the largest part of the mass.

As indicated above, the invention concerns in a special aspect a process for eliminating, in plastic materials such as plastic pipes, plastic film and sheeting, plastic containers and plastic interior fittings, low contents of odour/taste-producing substances of unknown character, which have been formed by physical and/or chemical action in the polymerisation process or the subsequent compounding/processing.

More precisely, according to the invention it has been found that the incorporation of small amounts of a substantially hydrophobic aluminium silicate molecular sieve, which preferably comprises a zeolite according to the above-mentioned U.S. Pat. No. 4,795,482, permits simple and more or less complete elimination of undesired odour- and/or taste-producing substances.

The characteristic features of the invention appear from the accompanying claims.

The invention is characterised in that it provides for a process for eliminating in plastic materials odour- and/or taste-producing components which have been formed in polymerisation, heat treatment or radiation.

After a number of experiments, it has been found according to the invention that not all zeolites are active. Thus, it has been established that the zeolite should be substantially hydrophobic (oleophilic) to be effective in the elimination of odour and taste. A measure of the hydrophobic properties is the water sorption of the zeolite, and this should suitably be less than 10 wt.-%, preferably less than 6 wt.-%, at 25° C. and 4.6 torr. The Si/Al molar ratio of the zeolite in the oxide units of its crystal lattice seems to affect the hydrophobic properties and should exceed 35 and preferably be between 200 and 500. The pore diameter of the zeolite, which according to the molecular size determines which compounds can be caught by the zeolite, should be at least 5.5 and preferably at least 6.2 Å.

The zeolite, which generally is in the form of a powder, should have such a small particle size that it does not detrimentally affect the appearance of the plastic material or the other properties thereof. Thus, the zeolite should have an average particle size not exceeding about 10 $\mu$m, such as about 0.1-7 $\mu$m, preferably not exceeding about 5 $\mu$m.

According to the invention, it has been found that a notably small amount of zeolite of less than 0.5 wt.-%, preferably 0.05-0.3 wt.-%, is sufficient to eliminate any undesired odour and/or taste. This distinguishes from earlier applications in which zeolites have normally been used in considerably higher contents.

In the process according to the invention, the aluminium silicate molecular sieve (zeolite) is added to the plastic raw material which in its molten state should be compounded to pellets or finished material. The zeolite can be added either as it is or in the form of a so-called master batch, i.e. mixed with a polymer. In the extruder or the corresponding compounding device, the components are mixed and the zeolite is uniformly distributed by dispersion in the molten polymer material. In the finished, formed plastic product, the zeolite will thus be present in this manner. It is surprising that, all the same, the zeolite can effectively produce its odour- and taste-eliminating effect, since it would have been assumed that the pores of the zeolite should be clogged by the molten plastic material. For some reason, however, this is not the case, but the zeolite can effectively catch and eliminate undesired, odour- and/or taste-causing substances.

For further elucidation of the invention an Example follows below.

EXAMPLE

For the purpose of determining the emission of taste-causing substances from different plastic materials, a great number of materials have been tested while using a taste panel. The testing materials have been produced by compounding an HD polyethylene having a density of 945 kg/m$^3$ and containing normal additives that are required for stabilisation/processing and also serving as reference material, and different molecular sieve materials at 220° C., on the one hand in a laboratory Buss-Kneter and, on the other hand, in a full-scale production line. The material was pelleted in conjunction with the extrusion. From pellets, a sample of 32 g was taken for each test, which was stirred for 4 h at a temperature of 30±1° C. by a magnetic agitating means in a flask fitted with a ground-in plug and containing 1000 ml of pure distilled water. Five sub-samples were then prepared from each sample by dilution according to the Table below.

TABLE

| Sub-sample No. | Sample water ml | Dilution water ml | Taste/odour level degree |
|---|---|---|---|
| 1 | 200 | 0 | 1 |
| 2 | 130 | 70 | 1.5 |
| 3 | 100 | 100 | 2 |
| 4 | 50 | 150 | 4 |
| 5 | 25 | 175 | 8 |

The level of taste and odour is here defined as follows: (a+b)/a wherein a is the amount of sample water in the sub-sample in which odour or taste is barely detectable, while b is the amount of dilution water in the same sub-sample. The lower the value of the taste and odour level the better the result. A value of 1.5 and below is acceptable. Seven trained taste testers are allowed to estimate each sample and determine their personal taste level. The average value of the seven people is considered to produce an objective estimation thereof. The testing is blind, i.e. the taste panel cannot distinguish the samples.

A total of 14 samples were examined according to this procedure, and the results were as follows:

TABLE 2

| Sample | Additive | Content wt. - % | Processing | Panel Estimate Sub-sample No. 1 | 2 | 3 | 4 | 5 | Taste Level |
|---|---|---|---|---|---|---|---|---|---|
| 1 | | | P | 7 | 7 | 6 | 6 | 5 | >8 |
| 2 | | | P | 6 | 6 | 6 | 6 | 5 | >8 |
| 3 | A3 | 0.22 | P | 7 | 7 | 7 | 7 | 6 | >8 |
| 4 | A3 | 0.22 | P | 6 | 6 | 6 | 5 | 3 | 4–8 |
| 5 | A3 | 0.22 | P | 7 | 7 | 7 | 6 | 1 | 4–8 |
| 6 | A10 | 0.12 | P | 7 | 7 | 6 | 6 | 4 | >8 |
| 7 | A10 | 0.11 | P | 7 | 7 | 7 | 7 | 6 | >8 |
| 8 | A10 | 0.10 | P | 7 | 7 | 7 | 6 | 4 | >8 |
| 9 | ABSC | 0.27 | P | 2 | 1 | 1 | 0 | 0 | <1 |
| 10 | ABSC | 0.27 | P | 5 | 3 | 2 | 1 | 0 | 1–1.5 |
| 11 | ABSC | 0.28 | P | 3 | 2 | 1 | 0 | 0 | <1 |
| 12 | ABSC | 0.25 | B | 0 | 0 | 0 | 0 | 0 | <1 |
| 13 | ABSC | 0.10 | B | 0 | 0 | 0 | 0 | 0 | <1 |
| 14 | ABSC | 0.05 | B | 0 | 0 | 0 | 0 | 0 | <1 |

A3 and A10 are common, non-hydrophobic zeolites which are supplied by Grace GmbH under the tradename "Sylosiv 3A" and "Sylosiv 10A", respectively. ABSC stands for ABSCENT which is the tradename of a zeolite produced according to U.S. Pat. No. 4,795,482. "P" implies that the sample has been run on a production scale in a compounding line, whereas "B" implies that the sample has been run on a laboratory scale in a small Buss-Cokneter. The figures under the heading "Panel Estimate" state how many of the people in the taste panel which have noticed the taste in the subsample 1, 2, 3, 4 and 5 of the respective main sample. Table 2 shows that the adding of conventional zeolite (Samples 3–8) produces no effect or a very poor effect in respect of eliminating odour/taste-causing substances, whereas the adding of a zeolite according to the invention (Samples 9–14) gives an excellent result.

We claim:

1. A process for reducing emission of odor/taste producing substances originating from plastic materials; said method including the steps of:
   (a) providing, during processing, plastic material in a molten state; said plastic material being selected from the group consisting essentially of: ethylene plastics, propylene plastics and mixtures thereof;
   (b) adding to the plastic material in the molten state an odor/taste emission reducing effective amount of hydrophobic aluminum silicate molecular sieve having: a pore diameter of at least 5.5 Å; an Si/Al molar ratio in the crystal lattice of at least 35; and, a sorption capacity for water at 25° C. and 4.6 torr of less than 10% by weight;
      (i) the molecular sieve being provided in the molten plastic material in an amount not greater than 0.5% by weight; and
   (c) mixing the plastic material and the molecular sieve and uniformly distributing the molecular sieve in the molten plastic material.

2. A process according to claim 1 wherein:
   (a) said step of adding aluminum silicate molecular sieve comprises adding sieve having: an Si/Al molar ratio in the crystal lattice of between 200 and 500; and, a sorption capacity for water at 25° C. and 4.6 torr of less than 6% by weight.

3. A process according to claim 2 wherein:
   (a) said step of adding molecular sieve comprises adding sieve having an average particle size not exceeding 5 μm.

4. A process according to claim 1 wherein:
   (a) said step of adding molecular sieve comprises adding sieve having an average particle size not exceeding 5 μm.

5. A process according to claim 4 wherein:
   (a) said step of adding molecular sieve comprises adding molecular sieve in an amount of 0.05–0.3% by weight.

6. A process according to claim 1 wherein:
   (a) said step of adding molecular sieve comprises adding molecular sieve in an amount of 0.05–0.3% by weight.

7. A process for preparing a plastic pipe material exhibiting low emission of odor/taste-producing substances that originate from the plastic material; said method including the steps of:
   (a) providing, during processing, plastic material in a molten state; said plastic material being selected from the group consisting essentially of: ethylene plastics, propylene plastics and mixtures thereof;
   (b) adding to the plastic material, in the molten state, an odor/taste emission reducing effective amount of hydrophobic aluminum silicate molecular sieve having: a pore diameter of at least 5.5 Å; an Si/Al molar ratio in the crystal lattice of at least 35; and, a sorption capacity for water at 25° C. and 4.6 torr of less than 10% by weight;
      (i) the molecular sieve being provided in the molten plastic material in an amount not greater than 0.5% by weight;
   (c) mixing the plastic material and the molecular sieve and uniformly distributing the molecular sieve in the molten plastic material; and
   (d) after the steps of adding the molecular sieve to the plastic material and mixing and uniformly distributing the molecular sieve in the plastic material, forming the plastic material into a pipe.

8. A process according to claim 7 wherein:
   (a) said step of adding aluminum silicate molecular sieve comprises adding sieve having: an Si/Al molar ratio in the crystal lattice of between 200 and 500; and, a sorption capacity for water at 25° C. and 4.6 torr of less than 6% by weight.

9. A process according to claim 7 wherein:
   (a) said step of adding molecular sieve comprises adding molecular sieve in an amount of 0.05–0.3% by weight.

10. A process for preparing film or sheeting from plastic material that exhibits low emission of odor/taste producing substances originating from the plastic material; said process including the steps of:
    (a) providing, during processing, plastic material in a molten state; said plastic material being selected from the group consisting essentially of: ethylene plastics, propylene plastics and mixtures thereof;
    (b) adding to the plastic material, in the molten state, an odor/taste emission reducing effective amount of hydrophobic aluminum silicate molecular sieve having: a pore diameter of at least 5.5 Å; an Si/Al molar ratio in the crystal lattice of at least 35; and, a sorption capacity for water at 25° C. and 4.6 torr of less than 10% by weight;
       (i) the molecular sieve being provided in the molten plastic material in an amount not greater than 0.5% by weight;
    (c) mixing the plastic material and the molecular sieve and uniformly distributing the molecular sieve in the molten plastic material; and (d) after the steps of adding the molecular sieve to the plastic material and mixing and uniformly distributing the molecular sieve in the plastic material, forming the plastic material into a film or sheeting.

11. A process according to claim 10 wherein:
    (a) said step of adding aluminum silicate molecular sieve comprises adding sieve having: an Si/Al molar ratio in the crystal lattice of between 200 and 500; and, a sorption capacity for water at 25° C. and 4.6 torr of less than 6% by weight.

12. A process according to claim 10 wherein:
    (a) said step of adding molecular sieve comprises adding molecular sieve in an amount of 0.05–0.3% by weight.

13. A process for preparing a plastic bottle or container from plastic material that exhibits low emission of odor/taste-producing substances originating from the plastic material; said process including the steps of:
    (a) providing, during processing, plastic material in a molten state; said plastic material being selected from the group consisting essentially of: ethylene plastics, propylene plastics and mixtures thereof; and
    (b) adding to the plastic material, in the molten state, an odor/taste emission reducing effective amount of hydrophobic aluminum silicate molecular sieve having: a pore diameter of at least 5.5 Å; an Si/Al molar ratio in the crystal lattice of at least 35; and, a sorption capacity for water at 25° C. and 4.6 torr of less than 10% by weight;
        (i) the molecular sieve being provided in the molten plastic material in an amount not greater than 0.5% by weight;
    (c) mixing the plastic material and the molecular sieve and uniformly distributing the molecular sieve in the molten plastic material; and
    (d) after the steps of adding the molecular sieve to the plastic material and mixing and uniformly distributing the molecular sieve in the plastic material, forming the plastic material into a bottle or container.

14. A process according to claim 13 wherein:
    (a) said step of adding aluminum silicate molecular sieve comprises adding sieve having: an Si/Al molar ratio in the crystal lattice of between 200 and 500; and, a sorption capacity for water at 25° C. and 4.6 torr of less than 6% by weight.

15. A process according to claim 13 wherein:
    (a) said step of adding molecular sieve comprises adding molecular sieve in an amount of 0.05–0.3% by weight.

16. A process for preparing a plastic interior fitting for a building or car from plastic material that exhibits low emission of odor/taste-producing substances originating from the plastic material; said process including the steps of:
    (a) providing, during processing, plastic material in a molten state; said plastic material being selected from the group consisting essentially of: ethylene plastics, propylene plastics and mixtures thereof; and
    (b) adding to the plastic material, in the molten state, an odor/taste emission reducing effective amount of hydrophobic aluminum silicate molecular sieve having: a pore diameter of at least 5.5 Å; an Si/Al molar ratio in the crystal lattice of at least 35; and, a sorption capacity for water at 25° C. and 4.6 torr of less than 10% by weight;
        (i) the molecular sieve being provided in the molten plastic material in an amount not greater than 0.5% by weight;
    (c) mixing the plastic material and the molecular sieve and uniformly distributing the molecular sieve in the molten plastic material; and
    (d) after the steps of adding the molecular sieve to the plastic material and mixing and uniformly distributing the molecular sieve in the plastic material, forming the plastic material into a car or building interior fitting.

17. A process according to claim 16 wherein:
    (a) said step of adding aluminum silicate molecular sieve comprises adding sieve having: an Si/Al molar ratio in the crystal lattice of between 200 and 500; and, a sorption capacity for water at 25° C. and 4.6 torr of less than 6% by weight.

18. A process according to claim 16 wherein:
    (a) said step of adding molecular sieve comprises adding molecular sieve in an amount of 0.05–0.3% by weight.

* * * * *

UNITED STATES PATENT AND TRADEMARK OFFICE
CERTIFICATE OF CORRECTION

PATENT NO. : 5,436,282
DATED : July 25, 1995
INVENTOR(S) : Gustafsson et al.

It is certified that error appears in the above-indentified patent and that said Letters Patent is hereby corrected as shown below:

On the title page, item [30], Foreign Data, "9100181" should read --91001818--.

In column 8, claim 16, line 22, "tort" should be --torr--.

Signed and Sealed this

Twenty-first Day of January, 1997

Attest:

BRUCE LEHMAN

Attesting Officer

Commissioner of Patents and Trademarks